United States Patent
Sezgin et al.

(10) Patent No.: US 6,995,485 B2
(45) Date of Patent: Feb. 7, 2006

(54) ROTARY TRANSFORMER

(75) Inventors: Acar Sezgin, Ludwigsburg (DE);
Hans-Peter Groeter, Vaihingen (DE);
Matthias Spaeth, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/257,652

(22) PCT Filed: Dec. 4, 2001

(86) PCT No.: PCT/DE01/04562

§ 371 (c)(1),
(2), (4) Date: May 8, 2003

(87) PCT Pub. No.: WO02/067276

PCT Pub. Date: Aug. 29, 2002

(65) Prior Publication Data

US 2003/0173936 A1    Sep. 18, 2003

(30) Foreign Application Priority Data

Feb. 17, 2001   (DE) ................................ 101 07 577

(51) Int. Cl.
*H02K 11/00*   (2006.01)
(52) U.S. Cl. ..................... 310/68 D; 310/112; 310/114
(58) Field of Classification Search ............. 310/68 D, 310/112, 113, 114
See application file for complete search history.

(56) References Cited

U.S. PATENT DOCUMENTS 4,612,486 A  *  9/1986  Ban et al. ................... 318/254
5,519,275 A  *  5/1996  Scott et al. .................. 310/112
5,572,178 A  * 11/1996  Becker et al. .............. 336/120
5,770,909 A  *  6/1998  Rosen et al. ................ 310/113

FOREIGN PATENT DOCUMENTS

| DE | 2 122 520   | 11/1971 |
|----|-------------|---------|
| DE | 23 47 656 A | 4/1974  |
| DE | 100 20 949 A| 2/2001  |
| EP | 0 688 028 A | 12/1995 |
| EP | 0 860 936 A | 8/1998  |
| FR | 2 775 383 A | 8/1999  |

OTHER PUBLICATIONS

Patent Abstracts of Japan vol. 010, No. 306 (E-446) Oct. 17, 1986 & JP 61 120409 A Jun. 7, 1986.

* cited by examiner

*Primary Examiner*—Darren Schuberg
*Assistant Examiner*—Nguyen N. Hanh
(74) *Attorney, Agent, or Firm*—Michael J. Striker

(57) ABSTRACT

A rotation transmitter for rotor-excited electrical machines, in particular for synchronous generators in motor vehicles, is disclosed, which has a primary part (14) with a primary core (17) comprised of a magnetically conductive material and a primary winding (18) inserted into it, and has a coaxial secondary part (15) that can rotate in relation to the primary part (14) and has a secondary core (20) comprised of magnetically conductive material and a secondary winding (21). In order to achieve a small diameter design and in order to control the radial forces produced in the rotating secondary core (20), the primary and secondary parts (14, 15) are disposed next to each other in the axial direction and the primary and secondary cores (17, 20) have flat end faces (171, 201) oriented toward each other, which enclose an axial working air gap (23) between them

28 Claims, 6 Drawing Sheets

Figure 1:
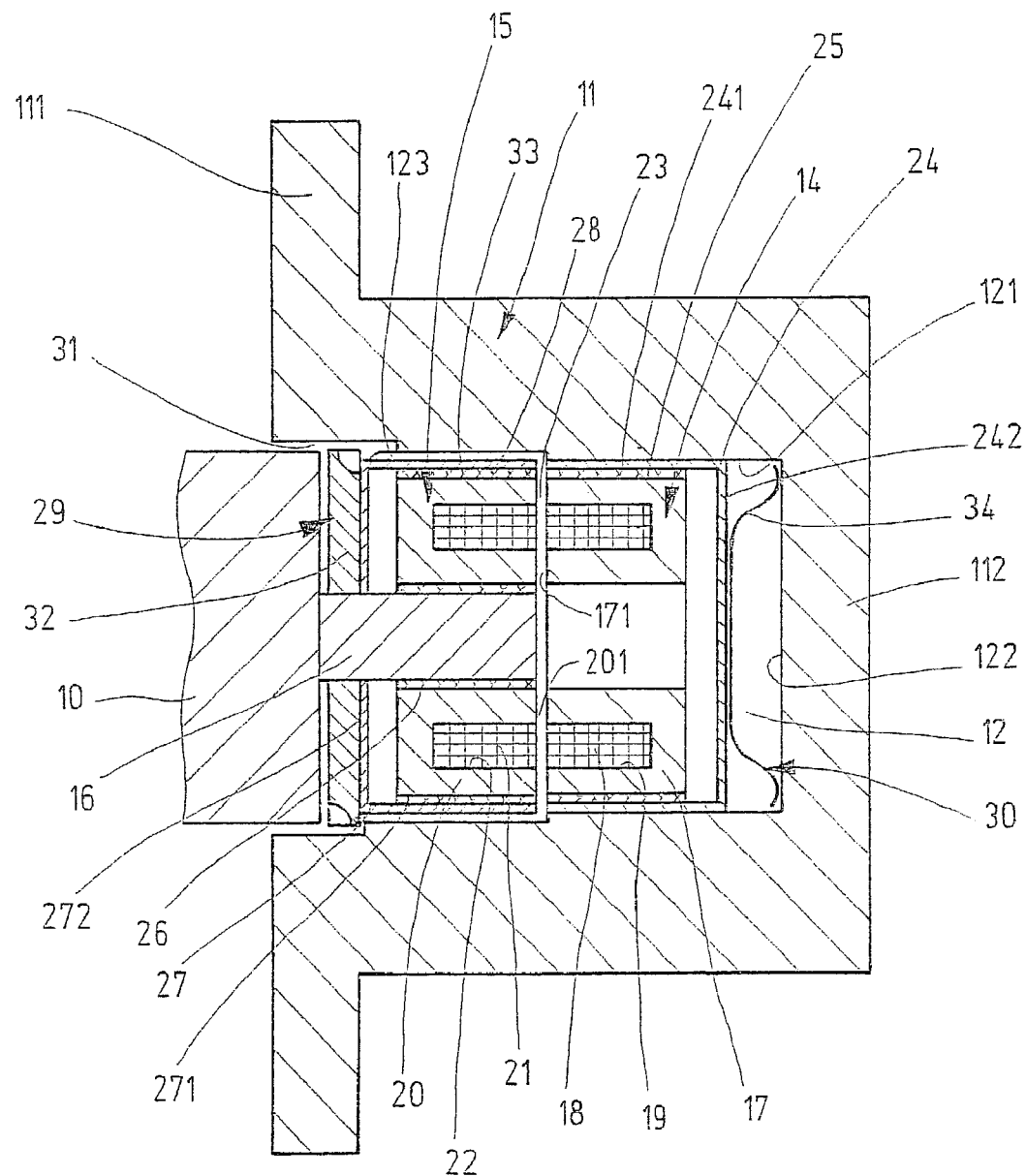

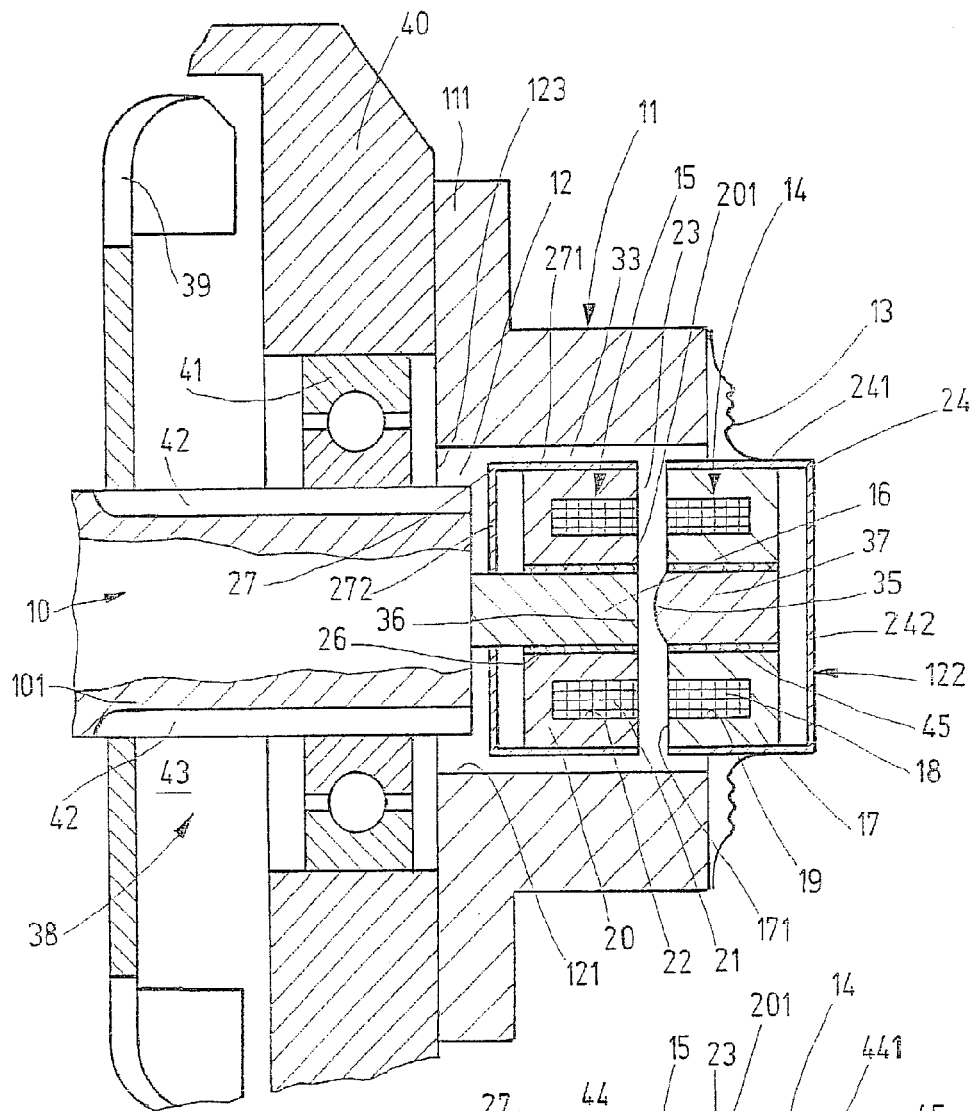
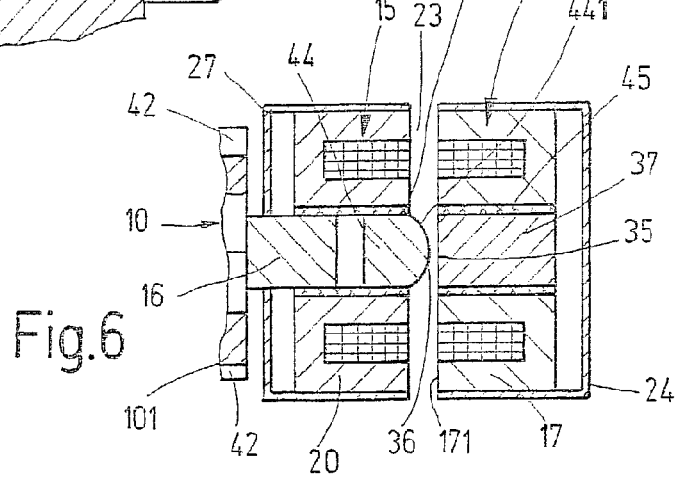
Fig.5
Fig.6

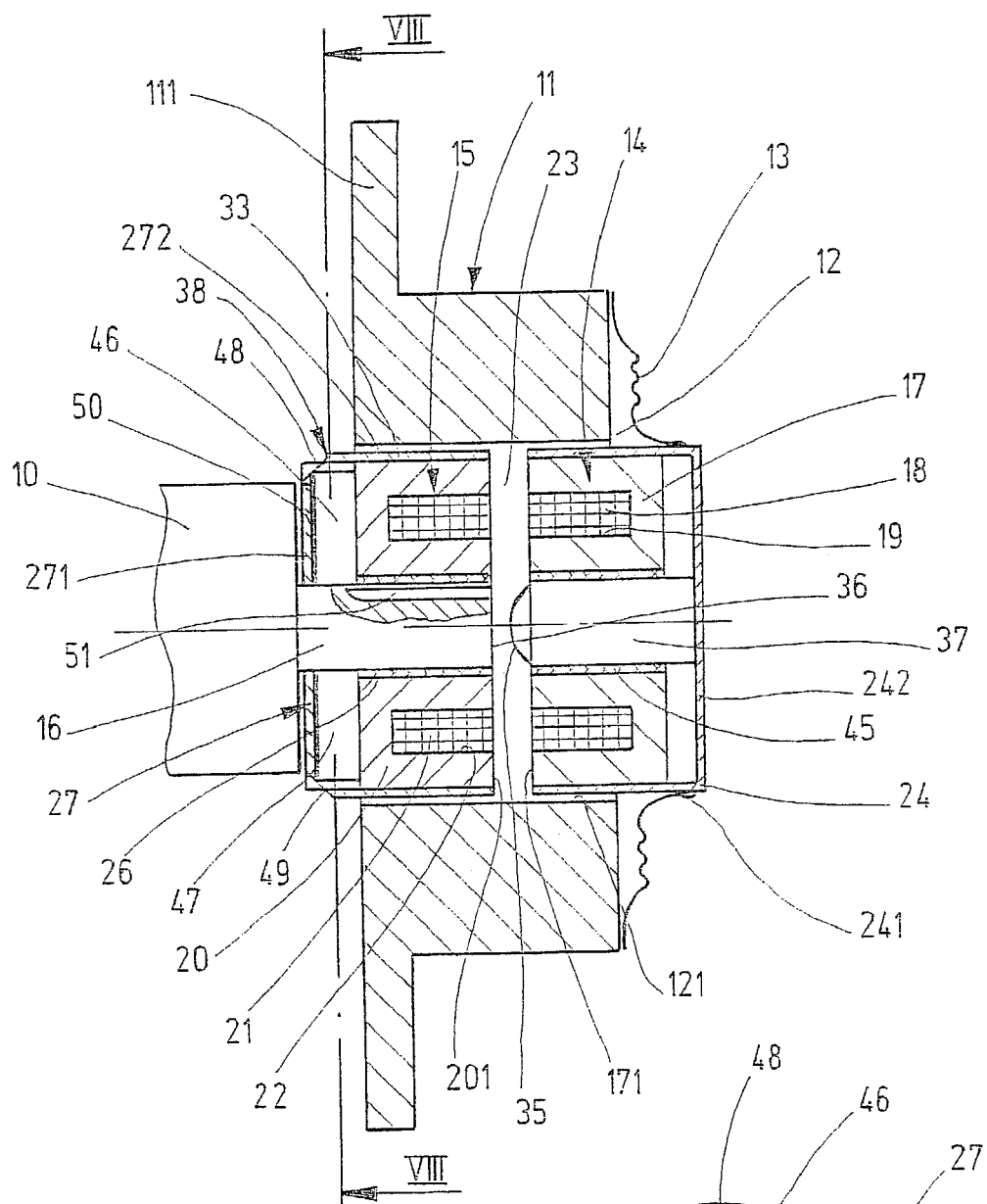
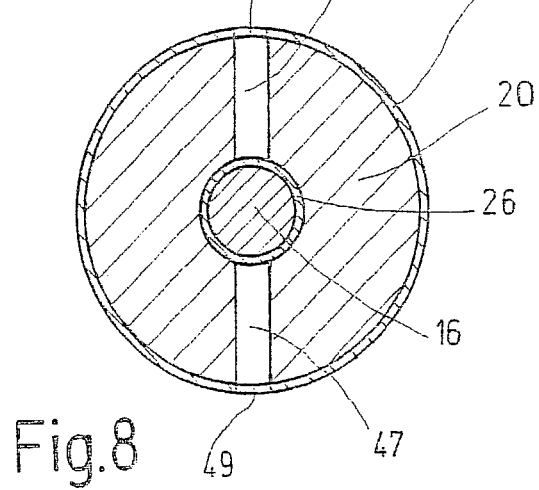

ROTARY TRANSFORMER

PRIOR ART

The invention is based on a rotation transmitter for rotor-excited electrical machines, in particular for synchronous generators in motor vehicles, according to the preamble to claim 1.

Rotation transmitters or rotary transformers of this kind are used in rotor-excited electrical machines, in particular synchronous generators, for slip ring-free transmission of the excitation current to the field-excitation winding of the rotor so that by eliminating the slip rings, which are subject to wear, the machines become rugged and largely maintenance-free, which is particularly desirable if the machines are to be used in synchronous generators in motor vehicles. In one known synchronous generator with a rotary transformer (DE 21 22 520 A1), a primary part and secondary part are disposed concentric to each other, the primary part encompassing the secondary part. The primary part is mounted along with a voltage regulator onto the generator housing so that it is disposed outside a pivot bearing of the rotor shaft. The secondary part is fastened to the rotor by means of a centering sleeve and a screw that passes through the centering sleeve coaxially and is screwed into the end of the rotor shaft. The primary core of the primary part, which is comprised of magnetically conductive material, and the secondary core of the secondary part, which is comprised of magnetically conductive material, reach embodied in the form of a hollow cylinder and are provided with annular groove recesses on their cylinder walls oriented toward each other, which respectively contain the primary and secondary windings. The cylinder walls oriented toward each other of the core, which is preferably made of ferrite, mutually enclose a working air gap of 0.07 to 0.13 mm between themselves, which is embodied as an annular gap.

ADVANTAGES OF THE INVENTION

The rotation transmitter according to the invention has the advantage that it has a small diameter design, which can be externally flange-mounted to the machine housing of the electric machine; the secondary part disposed closer to the electric machine can be simply coupled to the machine shaft. The externally exposed secondary part allows additional means for absorbing rotation forces to be provided and easily attached without disadvantageously intruding into the functionally relevant working air gap between the primary and secondary parts. As a result, strength problems in the sintered ferrite material of the secondary core can be controlled even at high speeds of the machine.

Advantageous modifications and improvements of the rotation transmitter disclosed to claim 1 are possible by means of the steps taken in the remaining claims.

According to a preferred embodiment of the invention, the secondary part is coupled to a drivable shaft journal in a rotationally fixed manner, the primary part is secured in a rotationally fixed, axially mobile fashion, and additional means are provided, which maintain a minimal axial air gap as a working air gap between the end faces of the primary and secondary cores. The mobility of the primary part and the provision of the maintenance means permit the axial or working air gap between the primary and secondary cores—which is important for the function and efficiency of the rotation transmitter, should be as small as possible, and is typically smaller than 0.3 mm—to be set and kept sufficiently small during operation of the rotation transmitter and therefore reliably prevents the end faces of the primary and secondary cores from coming into contact with each other. There is a simultaneous compensation for a concatenation of tolerances of the machine components, which add up over the axis of the electrical machine. There is also the advantage that in the design of the rotation transmitter according to the invention, with the disposition of the primary and secondary parts next to each other in the axial direction, the relatively high frequency axial vibrations or oscillations that occur in electric machines do not cause malfunctions in the rotation transmitter.

According to an advantageous embodiment of the invention, the secondary core is fastened in a radially and axially fixed manner to the shaft journal; the attachment is produced with a glue and/or filler, which is disposed as an annular joint between the shaft journal and the secondary core. Since the secondary core is manufactured out of ferrite material using the sintering process, it undergoes a shrinking process of up to 40% by volume. Through the attachment by means of glue and/or filler and the provision of relatively large glue joints, depending on manufacturing tolerances, the secondary core can be correctly positioned to an adequate degree so that a remachining of the ferrite cores is unnecessary. However, the circular ring-shaped end faces of the primary and secondary cores oriented toward each other are advantageously ground flat and are coated with an antifriction layer, e.g. Teflon, to protect against an axial contact.

For relatively high speeds of the rotation transmitter, according to an advantageous embodiment of the invention, the secondary part has a retainer, which externally encompasses the secondary core and is secured to the shaft journal in a rotationally fixed manner. In this case, too, a glue and/or filler joint is provided between the outer circumference of the secondary core and the inner surface of the retainer in order to compensate for manufacturing tolerances of the secondary core. In order to also be able to compensate for manufacturing tolerances of the secondary core in the axial direction, according to an advantageous embodiment of the invention, the axial length of the retainer is selected to be greater than the maximal axial length of the secondary core, taking manufacturing tolerances into account, so that the secondary core can be fastened to the shaft journal with its flat end face spaced a definite distance apart from a reference surface on the housing.

According to an advantageous embodiment of the invention, the primary and secondary parts are accommodated in a chamber, which is open at one end and has a cylindrical chamber wall and a chamber bottom, and the secondary part is centered in the chamber so that an annular gap remains between it and the cylindrical chamber wall. The primary part is either guided axially on the cylindrical chamber wall or is secured in a floating fashion in the chamber by means of a flexible diaphragm that constitutes the chamber bottom. The means according to the invention for maintaining a minimal breadth of the working air gap either have a device for generating an excess air pressure or a device for generating a negative air pressure in the chamber. In the first instance, a restoring element is also provided, which exerts an axial force on the primary part directed toward the secondary part, and in the second instance, a stop and an associated counterpart stop are provided on the primary and secondary parts and are embodied so that when they strike against each other, the working air gap enclosed between the end faces of the primary and secondary parts assumes the minimal breadth.

According to an advantageous embodiment of the invention, the device for producing an excess pressure in the chamber is comprised in a particularly simple manner of an excess pressure chamber disposed immediately in front of the chamber and an impeller supported on the shaft journal in a rotationally fixed manner in the excess pressure chamber. When the shaft journal rotates, the impeller forces air through the annular gap between the secondary part and the cylindrical chamber wall and a pressure cushion is produced in the axial working gap, which counteracts the restoring element. Because the pressure increases as the speed of the impeller increases, the axial breadth of the working air gap increases in a speed-dependent fashion, which is advantageous since axial vibrations of the electrical machine also increase with the speed. Since the working air gap is increasing, the increased oscillations of the machine, which are transmitted to the shaft journal, do not cause any contact whatever—no matter how short—between the end faces of the primary and secondary parts.

According to an advantageous embodiment of the invention, the device for generating a negative pressure in the chamber can be embodied in that a machine shaft, which supports the shaft journal at its end and belongs to an electrical machine that drives the shaft journal, is contained in a pivot bearing that partially overlaps the chamber and is inserted into the chamber with its end region, and that in the pivot bearing region, axial grooves are let into the machine shaft, which connect the chamber to a negative pressure region on the side of the pivot bearing oriented away from the chamber. This negative pressure region is advantageously produced by the fan of the electrical machine, which is usually supported on the machine shaft. By means of the negative pressure thus produced in the closed chamber, the primary core is pulled toward the secondary core until, by means of the stop and the counterpart stop striking against each other, the smallest air gap breadth of the axial or working air gap is achieved. With relatively high frequency vibrations of the drive shaft, the axial motion of the primary part is thereby damped by the necessary volume change work in an expansion and contraction of the working air gap between the primary and secondary parts.

According to an alternative embodiment of the invention, the desired negative air pressure in the chamber can also be produced by virtue of the fact that the secondary part, on an end oriented away from the primary part, protrudes beyond the chamber opening with a projecting region and that in the projecting region, two diametrically opposed radial conduits are let into the secondary core, which each communicate with a respective axial groove, which extends in the shaft journal and opens out at the end face of the shaft journal oriented toward the working air gap. The two radial conduits, which, according to an advantageous embodiment of the invention, are comprised of radial grooves in the end face of the secondary part oriented away from the working air gap, function as a pump during rotation of the shaft journal and, by means of the axial grooves in the shaft journal, which act as overflow conduits, generate a negative pressure in the working air gap, which is kept to a minimum breadth by means of the stop and counterpart stop. The partial protrusion of the secondary part beyond the opening of the chamber achieves a decoupling of the airflow so that the excess pressure prevailing at the outlet openings of the radial conduits does not push air directly back into the chamber by means of the annular gap between the secondary part and the chamber wall. Relatively high frequency vibrations occurring in the shaft journal and the accompanying axial movements of the primary part are damped by the necessary volume change work during the expansion and contraction of the working air gap; the damping action depends on the size of the annular gap between the secondary part and the cylindrical chamber wall and also depends on the cross section of the overflow conduits constituted by the axial grooves in the shaft journal.

DRAWINGS

The invention will be explained in detail in the following description in conjunction with exemplary embodiments shown in the drawings.

FIGS. 1 to 5 schematically depict an axial or longitudinal section through a rotation transmitter according to different exemplary embodiments, FIG. 6 schematically depicts a detail of the rotation transmitter in FIG. 5, with a modification of the stop and counterpart stop between the primary and secondary parts, FIG. 7 schematically depicts an axial or longitudinal section through a rotation transmitter according to another exemplary embodiment, FIG. 8 schematically depicts a section along the line VIII—VIII in FIG. 7.

DESCRIPTION OF THE EXEMPLARY EMBODIMENTS

The rotation transmitter for a rotor-excited electrical machine, in particular for a synchronous generator in motor vehicles, which is shown in various exemplary embodiments in FIGS. 1 to 8, is externally flange-mounted to the machine housing 40 (FIG. 6), coaxial to the machine shaft 10, a portion of which is shown in FIGS. 1 to 7. The rotation transmitter has a housing 11 with an end face 111 for attachment to the machine housing 40. The housing 11 contains a chamber 12 with a cylindrical chamber wall 121, a chamber opening 123, and a chamber bottom 122 disposed opposite it. In the exemplary embodiment in FIG. 1, the chamber bottom 122 is constituted by a rigid housing wall 112 and in FIGS. 1 to 7, it is constituted by a flexible diaphragm 13 whose edges are affixed to the housing 11.

In all of the exemplary embodiments, the rotation transmitter has a primary part 14 and a secondary part 15, which are disposed next to each other in the axial direction in the chamber 12. The primary part 14 is secured in the chamber 12 so that it cannot rotate, but can move axially. The secondary pat 15 is secured in a rotationally and axially fixed manner to a shaft journal 18, which is connected to the machine shaft 10 in a rotationally fixed manner or can also be embodied of one piece with it. The primary part 14 has a hollow cylindrical primary core 17 made of magnetically conductive material, e.g. ferrite, with a flat, circular ring-shaped end face 171 and a primary winding 18, which is contained in a concentric annular groove 19 that is let into the end face 171. The secondary part 15 has a hollow cylindrical secondary core 20 made of magnetically conductive material, e.g. ferrite, with a flat, circular ring-shaped end face 201 and a secondary winding 21, which is contained in a concentric annular groove 22 that is let into the end face 201. The primary part 14 and secondary part 15 are disposed so that the flat end faces 171, 201 of the primary and secondary cores 17, 20 are oriented toward each other and for the boundaries of a working air gap 23. The primary core 17 is contained in a cup-shaped retainer 24 with a cup wall 241 and a cup bottom 242, and is fastened to the cup wall 241. In order to compensate for manufacturing tolerances of the primary core 17, the attachment is comprised of a glue and/or filler, which is introduced between the primary core 17 and the cup wall 241 with a sufficiently thick glue joint 25 adapted to the manufacturing tolerances of the primary core 17. The secondary core 20 is likewise fastened to the shaft journal 16 by means of a glue joined 26. In order to absorb greater rotation forces, the secondary part 15 also has a cup-shaped retainer 27 with a cup wall 271 and a cup bottom 272; the cup wall 271 encompasses the secondary core 20 externally and a cup bottom 272 encompasses the shaft journal 16 so that the rotation forces from the shaft journal 16 are absorbed. In order to compensate for manufacturing tolerances, an annular gap-shaped glue joint 28 comprised of a glue and/or filler is again provided between the secondary core 20 and the cup bottom 272. In order to compensate for length tolerances in the secondary core 20, the axial length or height of the cup wall 241 is dimensioned larger than the maximal length of the secondary core 20, taking manufacturing tolerances into account, so that the secondary core 20 can be correctly positioned to a certain degree in order to adjust a suitable working air gap 23 and does not require remachining. As a sole remachining procedure for the two cores 17, 18, the end faces 171 and 201 oriented toward each other are ground in order to obtain a usable working air gap 23. In the exemplary embodiments of the rotation transmitter according to FIGS. 1 to 3, the end faces 171 and 201 are also provided with a coating, e.g. of Teflon, to prevent a direct contact between the two ferrite cores.

The presence of the working air gap 23 between the primary part 14 and the secondary part 15 is of crucial importance to a proper functioning of the rotation transmitter; on the one hand, this working air gap should be as small as possible in order to achieve a high efficiency, typically less than or equal to 0.3 mm, and on the other hand, this gap should prevent contact between the end faces 171, 201 of the primary and secondary cores 17, 20. The in order to assure this axial working air gap 23, the rotation transmitter is provided with means, which maintain a minimum breadth of the working air gap 23 at least during operation of the rotation transmitter. In the various exemplary embodiments of the rotation transmitter according to FIGS. 1 to 7, these means are embodied in different ways.

In the exemplary embodiments of the rotation transmitter according to FIGS. 1 to 3, the means for maintaining the minimal breadth of the working air gap 23 have a device for generating an excess air pressure in the chamber 12, referred to below for short as excess pressure generator 29, and a restoring element 30 that acts on the primary part 14 with an axial force directed toward the secondary part 15. The excess pressure generator 29 includes an excess pressure chamber 31 disposed immediately in front of the chamber 12 at its chamber opening 123 and an impeller 32 disposed in the excess pressure chamber 31 and supported on the shaft journal 16 in a rotationally fixed manner. The excess pressure chamber 31 here is constituted by a circular recess in the housing 11 situated coaxially in front of the chamber opening 123, which recess has an inner diameter slightly greater than the chamber diameter. The excess pressure generated in the excess pressure chamber by the impeller 32 upon rotation of the machine shaft 10 is conveyed to into the working air gap 23 by means of the annular gap 33 disposed between the secondary part 15 and the cylindrical chamber wall 121. As a result, an air cushion is generated between the two cores 17, 20 of the primary and secondary parts 14, 15, which sets the working air gap 23 as a function of the speed of the machine shaft 10. The axial force of the restoring element 30 functions as a countervailing force that opposes the excess pressure. In the exemplary embodiment of FIG. 1, the restoring element 30 is embodied as a spring 34, which is supported against the chamber bottom 122 on one side and against the cup bottom 242 of the retainer 24 on the other. The retainer 24 of the mobile primary part 14 is guided against the cylindrical chamber wall 121.

Figure 2:
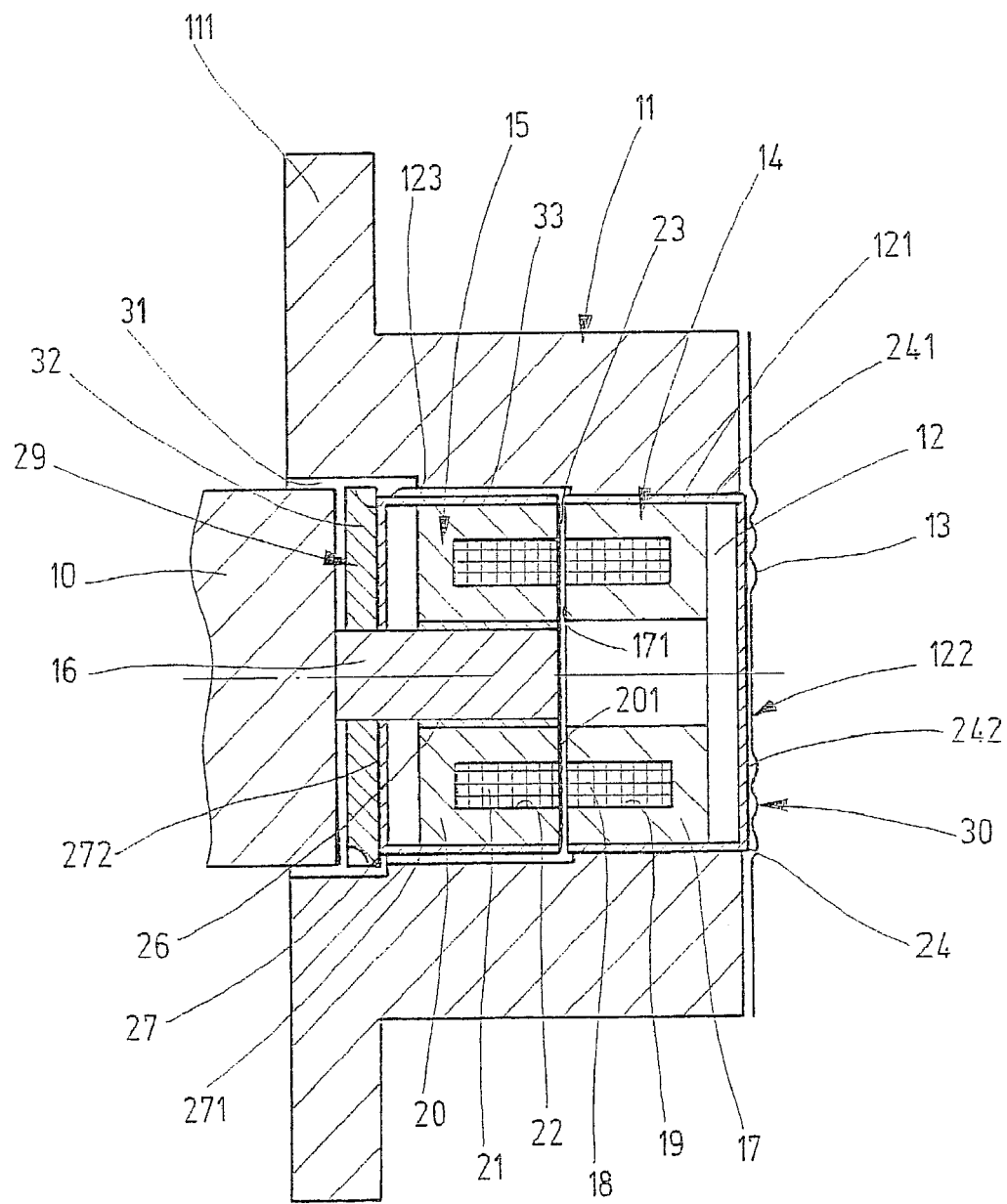

In the exemplary embodiment of the rotation transmitter according to FIG. 2, in which the retainer 24 of the primary part 14 is guided against the cylindrical chamber wall 121 of the chamber 12 and the chamber bottom 122 is constituted by the diaphragm 13, the diaphragm 13 simultaneously performs the function of the restoring element 30 and generates the axial countervailing force that opposes the excess pressure, which is generated in the chamber 12 by the excess pressure generator 29 that functions as a peripheral pump system. In FIG. 2 and in the remaining figures, the depiction of the glue joints 25 and 28 between the primary core 17 and the cup wall 241 of the retainer 24 and between the secondary core 20 and the cup wall 271 of the retainer 27 have been omitted. These glue joints 25, 28, however, are also provided here to attach the cores 17, 20 while simultaneously compensating for manufacturing tolerances.

Figure 3:
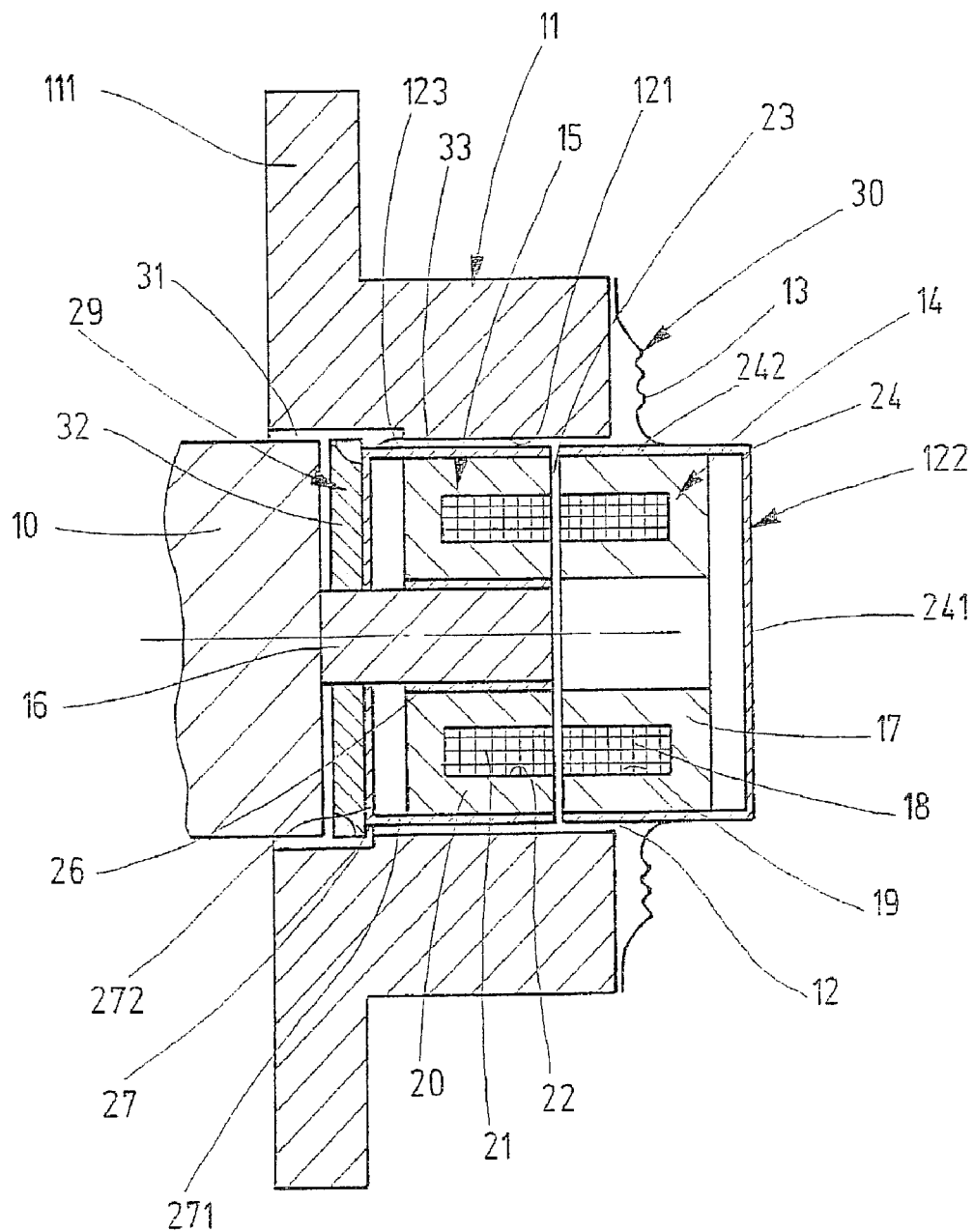

The exemplary embodiment of the rotation transmitter shown in FIG. 3 is modified in relation to the rotation transmitters described in conjunction with FIGS. 1 and 2 to the extent that the primary part 14 is not guided in an axially mobile fashion with its retainer 24 against the cylindrical chamber wall 221 of the chamber 12, but is guided in a floating fashion in the chamber 12. To this end, the flexible diaphragm 13 constituting the chamber bottom 122 is fastened to the retainer 24, in fact at the level of the center of gravity of the primary part 14 and thus keeps the primary part 14 centered in the chamber 12. The diaphragm 13 again constitutes the restoring element 30, which generates a countervailing force that opposes the excess pressure built up in the chamber 12 by the excess pressure generator 29. The above-described placement of the diaphragm 13 on the primary part 14 increases the available pressure area so that in comparison to the rotation transmitters according to FIGS. 1 and 2, a greater deflection of the primary part 14 is possible with lower pressures.

Figure 4:
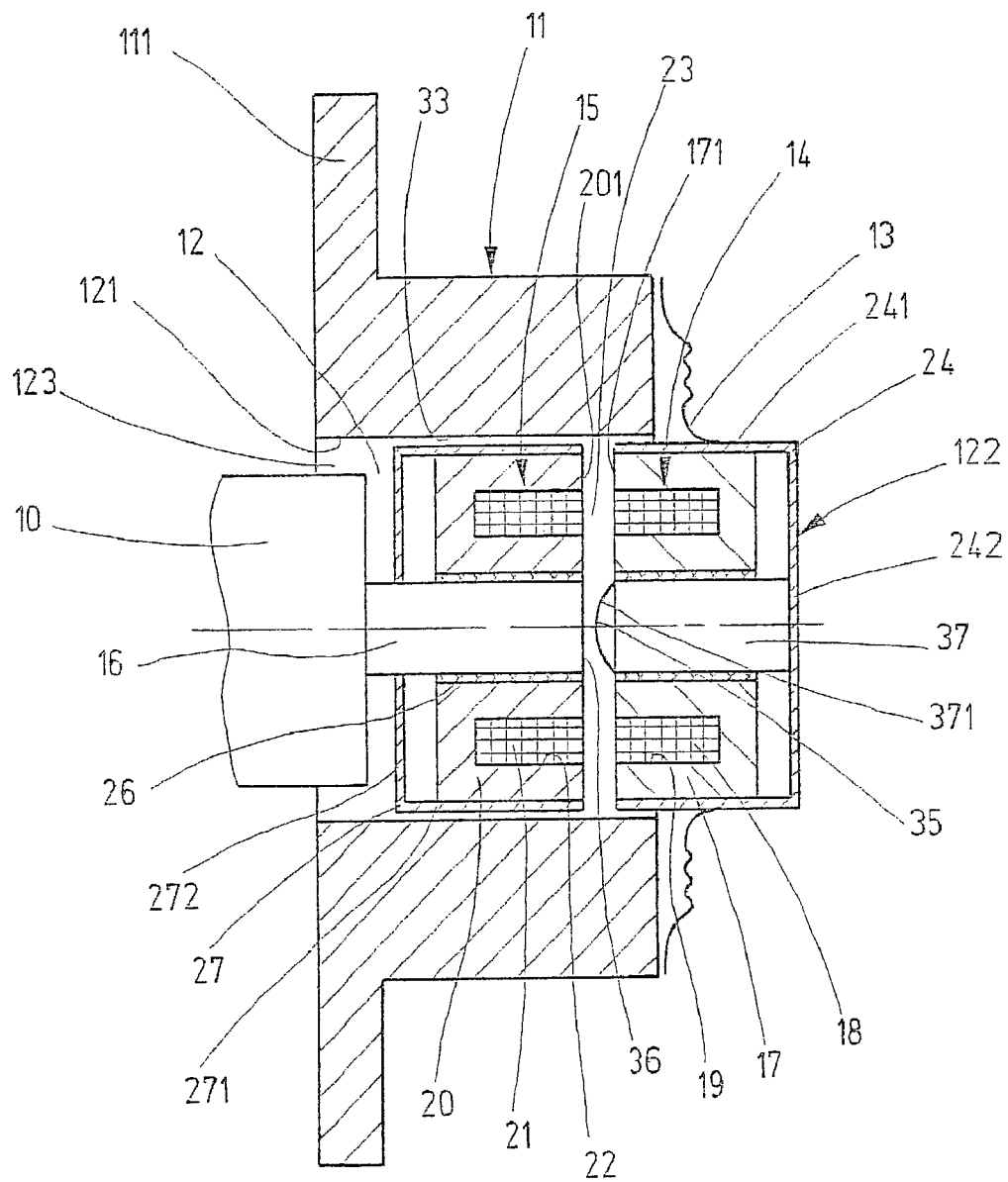

The rotation transmitter according to the exemplary embodiment depicted in FIG. 4 corresponds in design to the rotation transmitter according to FIG. 3, with the difference that the excess pressure generator 29 for setting the working air gap 23 has been eliminated. Here, the secondary core 20 is attached to the shaft journal 16, spaced a certain distance apart from the end face of the end flange 111 of the housing 11 and consequently sets the working air gap 23. The minimal breadth of the working air gap 23 set is assured by means of a stop 35 and a counterpart stop 36 on the primary part 14 and the secondary part 15; when the stop 35 and counterpart stop 36 strike against each other, the working air gap 23 reaches its minimum. The stop 35 and counterpart stop 36 are disposed aligned with the axes of the primary part 14 and the secondary part 15 and strike against each other at a single point.

In the exemplary embodiment of FIG. 4, the counterpart stop 36 is constituted by the flat end face of the shaft journal 16, which is flush with the flat end face 201 of the secondary core 20, and the counterpart stop 36 is constituted by a spacer 37, which is inserted into the hollow cylindrical primary core 17, is fastened by means of a glue layer 45, and protrudes with a spherical cap 371 beyond the end face 171 of the primary core 17. The height of the spherical cap 371 protruding beyond the end face 171 determines the minimal breadth of the axial working air gap 23. With relatively high frequency vibrations of the machine shaft 10, the axial movement of the primary part 14 is damped by the necessary volume change work in the expansion and contraction of the working air gap 23. The damping depends on the size of the annular gap 33 between the retainer 27 of the secondary part 15 and the cylindrical chamber wall 121 of the chamber 12. The diaphragm 13, whose edges are fastened to the housing 11 and which, together with the cup bottom 242 of the retainer 24, constitutes the chamber bottom 122, is fastened to the primary part 14 as close as possible to its center of gravity. Its positioning can also be used to compensate for length tolerances of the primary core 17.

The rotation transmitter depicted in FIG. 5 corresponds in design to the rotation transmitter shown in FIG. 4; in order to set and maintain the minimal breadth of the axial working air gap 23 of the chamber opening 123 of the chamber 12, a device for generating a negative air pressure in the chamber 12 is provided, which is referred to below for short as the negative pressure generator 38. This negative pressure generator 38 makes use of the native pressure generated by a fan 39 of the electric machine on the air inlet side of the machine housing 40. In order to produce the negative pressure generator 38, the machine shaft 10 is embodied so that it protrudes partially into the chamber 12 with its shaft section 101 that supports the shaft journal 16. The chamber opening 123 is covered by a pivot bearing 41, which encompasses the machine shaft 10 in the shaft section 101 and supports it in a rotary fashion in the machine housing 14. The region of the shaft section 101 encompassed by the pivot bearing, has axial grooves 42 let into it, which are distributed over the circumference; at one end, these grooves open out at the end face of the shaft section 101 in the chamber 12 and at the other end, they open out into a negative pressure region 43 generated by the fan 39 in the machine housing 40. The fan 39, which is supported on the shaft section 101 in a rotationally fixed manner, generates a negative pressure close to the machine shaft 10 in the region between the rotor of the electric machine and the pivot bearing 41. By means of the air conduits constituted by the axial grooves 42 in the shaft section 101, this negative pressure also prevails in the chamber 12 that is closed by the pivot bearing 41. The primary part 14, which is fastened to the diaphragm 13 and is held in a floating fashion in the chamber 12 by the diaphragm 13, is pulled toward the secondary part 15 by this negative pressure. As has been described in conjunction with FIG. 4, the primary part 14 and secondary part 15 are provided with a stop 35 and counterpart stop 36, which, when they strike against each other at a single point, define the minimum axial working air gap 23. With relatively high frequency vibrations, the axial movement of the primary part 14 is damped by the necessary volume change work in the expansion and contraction of the working air gap 23 between the primary core 17 and the secondary core 20. As in the rotation transmitter according to FIG. 4, here, too, the secondary core 20 is fastened to the shaft journal 16 spaced a definite distance apart from the end face of the end flange 111, thus predetermining the normal setting of the working air gap 23.

The exemplary embodiment of the rotation transmitter shown in a detail in FIG. 6 corresponds to the exemplary embodiment described above in conjunction with FIG. 5 and is only modified with regard to the embodiment of the stop 35 and the counterpart stop 36 on the primary part 14 and the secondary part 15. The secondary core 20 is again fastened to the shaft journal 16 spaced a definite distance apart from the end face of the end flange 111 of the housing 11; only a part of the secondary core 20 encompasses the shaft journal 16. The counterpart stop 36 on the secondary part 15 here is constituted by a spacer journal 44, which is inserted into the secondary core 20 spaced a definite distance apart from the end face 201 of the secondary core 20. This spacer journal 44 can be used to compensate for length tolerances of the machine shaft 10 connected to the shaft journal 16. In order to produce a single point contact of the stop 35 and the counterpart stop 36, the part of the spacer journal 44 that protrudes beyond the end face 201 of the secondary core 20 is embodied as a spherical cap 441. The stop 35 is again constituted by a spacer 37', which as in FIG. 5, is inserted into the hollow cylindrical primary core 17 and is attached by means of the glue layer 45. The end face of the spacer 37' oriented toward the spacer journal 44 in the secondary core 20 is embodied as flat and terminates flush with the end face 171 of the primary core 17. The function of the rotation transmitter according to FIG. 6 is identical to the one described in conjunction with FIG. 5.

The exemplary embodiment of the rotation transmitter shown in different sections in FIGS. 7 and 8 corresponds essentially to the rotation transmitter described in conjunction with FIG. 5 and differs from it only with regard to the negative pressure generator 38. In order to produce the negative pressure generator 38, the end of the secondary part 15 oriented away from the primary part 14 protrudes with a projecting region beyond the chamber opening 123 of the chamber 12 and inside this projecting region, two radial conduits 46, 47 are let into the secondary core 20 on diametrically opposed sides and extend to the shaft journal 16. The radial conduits 46, 47 are constituted by radial grooves, which are let into the end face of the secondary core 20 that rests against the cup bottom 272 of the retainer 27 of the secondary part 15. The ends of these radial grooves are each aligned with a respective opening 48, 49 in the retainer 27 so that the radial conduits 46, 47 are open at the circumference of the secondary part 15. The secondary core 20 is again connected to the shaft journal 16 by means of the glue joint 26 and is also affixed by means of a glue layer 50, with its end face against the cup bottom 272 of the retainer 27. By means of overflow conduits 51 extending in the shaft journal 16, the radial conduits 46, 47 communicate with the axial working air gap 23 between the end faces 171, 201 of the primary core 17 and the secondary core 20.

The overflow conduits 51 are each comprised of an axial groove, which is let into the shaft journal 16, opens out at the end face 201 of the secondary core 20 on one end, and extends to below the opening of the associated radial conduit 46, 47 on the inner wall of the hollow cylindrical secondary core 20. When the machine shaft 10 rotates, the radial conduits 46, 47 function as a centrifuge and generate a negative pressure in the axial working air gap 23 by means of the overflow conduits 51. The primary part 14 suspended on the diaphragm 13 is therefore pushed with its spacer 37 toward the shaft journal 16 as the speed increases so that the stop 35 and the counterpart stop 36 strike against each other at a single point. This sets the working air gap 23. With relatively high frequency vibrations of the machine shaft 10, the axial movement of the primary part 14 is damped by the necessary volume change work in the expansion and contraction of the working air gap 23; the damping once again depends on the size of the annular gap 33 between the retainer 27 of the secondary part 15 and the chamber wall 121 of the chamber 12 and also depends on the cross section of the overflow conduits 51. In order to assure that the emerging excess pressure, which is produced at the openings 48, 49 upon rotation of the machine shaft 10, does not exert pressure at this point through the annular gap 33 directly into the chamber 12, a decoupling is produced by inclining the openings 48 and 49 as shown in FIG. 7, so that they extend partially into the cup wall 271 and partially into the cup bottom 272, thus allowing the air at the outer circumference of the secondary part 15 to flow out of the radial conduits 46, 47 unhindered.

What is claimed is:

1. A rotation transmitter for rotor-excited electrical machines, in particular for synchronous generators in motor vehicles, with a primary part (14) mat has a primary core (17) comprised of a magnetically conductive material that has a primary winding (18) inserted into it, and with a coaxial secondary part (15) that can rotate in relation to the primary part (14) and has a secondary core (20) comprised of magnetically conductive material that has a secondary winding (21) inserted into it, the primary and secondary parts (14, 15) are disposed next to each other in the axial direction and the primary and secondary cores (17, 20) have flat end faces (171, 201) oriented toward each other, which enclose an axial working air gap (23) between them, characterized in that the primary and secondary parts (14, 15) are accommodated in a chamber (12), which is open at one end and has a cylindrical chamber wall (121), a chamber bottom (122), and a chamber opening (123), and that a radial annular gap (33) is provided between the chamber wall (121) and the secondary part (15).

2. The rotation transmitter according to claim 1, characterized in that the chamber (12) is embodied in a housing (11) and the chamber bottom (122) is constituted by a diaphragm (13) whose edges are fastened to the housing (11).

3. The rotation transmitter according to claim 1, characterized in that the chamber (12) is embodied in a housing (11) and the chamber bottom (122) is constituted by a rigid housing wall (112).

4. The rotation transmitter according to claim 1, characterized in that means for maintaining the minimal breadth of the working air gap (23) are provided and have a device (29) for generating an excess air pressure in the chamber (12) and a restoring element (30) that acts on the primary part (14) with an axial force directed toward the secondary part (15).

5. The rotation transmitter according to claim 4, characterized in that the device for producing an excess pressure has an excess pressure chamber (31) disposed immediately in front of the chamber (12) and a coaxially disposed impeller (32) supported on the shaft journal (16) in a rotationally fixed manner in the excess pressure chamber (31).

6. The rotation transmitter according to claim 5, characterized in that the excess pressure chamber (31) is constituted by a circular recess in the housing (11), which recess is disposed coaxial to the chamber (12), in front of the chamber opening (123).

7. The rotation transmitter according to claim 3, characterized in that the restoring element (30) is embodied as a spring (34), which is supported between the primary part (14) and the chamber bottom (122).

8. The rotation transmitter according to claim 2, characterized in that the restoring element (30) is constituted by the diaphragm (30).

9. The rotation transmitter according to claim 1, characterized in that the primary part (14) is guided so that it can move axially against the chamber wall (121) of the chamber (12).

10. The rotation transmitter according to claim 8, characterized in that the primary part (14) is attached to the diaphragm (13) and centered by the diaphragm (13) so that a broad annular gap remains between the primary part (14) and the chamber wall (122).

11. The rotation transmitter according to claim 1, characterized in that means for maintaining a minimal breadth of the working air gap (23) are provided and have a stop (35) and a counterpart stop (36), which are disposed on the primary and secondary parts (14, 15) and are embodied so that when the stop (35) and counterpart stop (36) strike against each other, the working air gap (23) assumes the minimal breadth.

12. The rotation transmitter according to claim 11, characterized in that the stop (35) and counterpart stop (36) are embodied so that they strike against each other at a single point in the line of alignment of the axes of the primary and secondary parts (14, 15).

13. The rotation transmitter according to claim 11, characterized in that the stop (35) is constituted by the end face of the shaft journal (16), which supports the hollow cylindrical secondary core (20), and the counterpart stop (36) is constituted by a spacer (37), which is inserted into the hollow cylindrical primary core (17) and, with a spherical cap (371) that is of one piece with its end, protrudes beyond the end face (171) of the primary core (17).

14. The rotation transmitter according to claim 11, characterized in that the stop (35) and counterpart stop (36) are constituted by two spacers (37, 44) inserted into the hollow cylindrical primary and secondary cores (17, 20) and that at least one of the spacers (44) protrudes with a spherical cap (441) formed onto its end, beyond one of the end faces (201) of the primary and secondary cores (20).

15. The rotation transmitter according to claim 14, characterized in that one of the end faces of the spacers (37') oriented toward each other is flush with one of the end faces (171) of the primary and secondary cores (17) oriented toward each other.

16. The rotation transmitter according to claim 11, characterized in that means for maintaining the minimal breadth of the working air gap (23) are provided and have a device (38) for generating a negative air pressure in the chamber (12).

17. The rotation transmitter according to claim 16, characterized in that the device (38) for generating a negative pressure has a shaft section (101), which protrudes into the chamber (12), supports the shaft journal (16), and belongs a machine shaft (10) of an electrical machine that cooperates with the rotation transmitter, and has axial grooves (42) let into the shaft section (101), which connect the chamber (12) to a negative pressure region (43) produced in the machine.

18. The rotation transmitter according to claim 17, characterized in that the chamber opening (123) is closed by a pivot bearing (41) that encompasses the shaft section (101) and is fastened to a machine housing (40) of the electrical machine.

19. The rotation transmitter according to claim 18, characterized in that on the side of the pivot bearing (41) oriented away from the chamber (12), there is a fan (39), which is supported on the machine shaft (10) in a rotationally fixed manner.

20. The rotation transmitter according to claim 16, characterized in that at an end oriented away from the primary part (14), the secondary part (15) protrudes with a projecting region beyond the chamber opening (123) and that the device (38) for generating a negative air pressure has at least two radial conduits (46, 47) let into the secondary core (20) in the projecting region, which each communicate with a respective overflow conduit (51) that extends in the shaft journal (16) and is connected to the end face of the shaft journal (16) oriented toward the working air gap (23).

21. A rotation transmitter for rotor-excited electrical machines, in particular for synchronous generators in motor vehicles, with a primary part (14) that has a primary core (17) comprised of a magnetically conductive material that has a primary winding (18) inserted into it, and with a coaxial secondary part (15) that can rotate in relation to the primary part (14) and has a secondary core (20) comprised of magnetically conductive material that has a secondary winding (21) inserted into it, the primary and secondary parts (14, 15) are disposed next to each other in the axial direction and the primary and secondary cores (17, 20) have flat end faces (171, 201) oriented toward each other, which enclose an axial working air gap (23) between them, the secondary part (15) is coupled to a drivable shaft journal (16) in a rotationally fixed manner and the primary part (14) is secured in a rotationally fixed, axially mobile fashion and that means are provided for maintaining a minimal width of the axial working air gap (23), the secondary part (15) has a retainer (27) that externally encompasses the secondary core (20) and is supported on the shaft journal (16), the retainer (27) is embodied as a cup-shaped, with a cup wall (271) and a cup bottom (272) and that the cup bottom (272) is supported on the shaft journal (16) and the cup wall (271) encompasses the secondary core (20, characterized in that the secondary core (20) rests against the cup bottom (272) of the retainer (27) and radial conduits (46, 47) provided and are embodied as grooves, which are let into the end face of the secondary core (20) resting against the cup bottom (272) and at the ends, are each aligned with a respective opening (48, 49) in the retainer (27).

22. The rotation transmitter according to claim 21, characterized in that the secondary core (20) is attached to the cup bottom (272) of the retainer (27) by means of a glue layer (50).

23. A rotation transmitter for rotor-excited electrical machines, in particular for synchronous generators in motor vehicles, with a primary part (14) that has a primary core (17) comprised of a magnetically conductive material that has a primary winding (18) inserted into it, and with a coaxial secondary part (15) that can rotate in relation to the primary part (14) and has a secondary core (20) comprised of magnetically conductive material that has a secondary winding (21) inserted into it, the primary and secondary parts (14, 15) are disposed next to each other in the axial direction and the primary and secondary cores (17, 20) have flat end faces (171, 201) oriented toward each other, which enclose an axial working air gap (23) between them, wherein the secondary part (15) is coupled to a drivable shaft journal (16) in a rotationally fixed manner and the primary part (14) is secured in a rotationally fixed, axially mobile fashion and that means are provided for maintaining a minimal width of the axial working air gap (23), wherein the secondary part (15) has a retainer (27) that externally encompasses the secondary core (20) and is supported on the shaft journal (16), and wherein the retainer (27) is embodied as a cup-shaped, with a cup wall (271) and a cup bottom (272) and that the cup bottom (272) is supported on the shaft journal (16) and the cup wall (271) encompasses the secondary core (20).

24. The rotation transmitter according to claim 23, characterized in that the height of the cup wall (271) is dimensioned larger than the maximal axial length of the secondary core (20), taking manufacturing tolerances into account.

25. The rotation transmitter according to claim 23, characterized in that the secondary core (20) is fastened to the cup wall (271) of the retainer (27).

26. The rotation transmitter according to claim 23, characterized in that the primary part (14) has a retainer (24), which contains the primary core (17) and is guided in an axially mobile fashion.

27. The rotation transmitter according to claim 26, characterized in that the retainer (24) is embodied as cup-shaped, with a cup wall (241) and a cup bottom (242) and that the primary core (17) is fastened to the cup wall (241).

28. The rotation transmitter according to claim 27, characterized in flat the attachment is produced by means of a glue and/or filler that produced a glue joint (26, 28, 25).

* * * * *